United States Patent [19]

Little

[11] Patent Number: 5,642,413

[45] Date of Patent: Jun. 24, 1997

[54] TELEPHONE CALL ALERT DEVICE WITH SELECTABLE ALERT MODES

[76] Inventor: Randall P. Little, 813 Covered Bridge Way, Fairburn, Ga. 30213

[21] Appl. No.: 511,923

[22] Filed: Aug. 7, 1995

[51] Int. Cl.[6] ................................................. H04M 3/04
[52] U.S. Cl. ............... 379/373; 340/825.44; 340/825.46; 379/447
[58] Field of Search .................. 340/825.46, 407, 340/825.44, 311.1, 825.47, 825.48; 310/81; 379/373, 375, 57, 56, 58, 61, 455, 447; 381/192

[56] References Cited

U.S. PATENT DOCUMENTS

| | | | |
|---|---|---|---|
| 3,825,686 | 7/1974 | Kramell | 379/455 |
| 4,421,953 | 12/1983 | Zielinski | 379/56 |
| 5,107,540 | 4/1992 | Mooney et al. | 381/192 |
| 5,117,449 | 5/1992 | Metroka et al. | 379/58 |
| 5,131,030 | 7/1992 | Cameron | 379/375 |
| 5,172,092 | 12/1992 | Nguyen et al. | 340/311.1 |
| 5,175,459 | 12/1992 | Danial et al. | 310/81 |
| 5,181,023 | 1/1993 | Fujii | 340/825.46 |
| 5,293,161 | 3/1994 | MacDonald et al. | 340/825.46 |
| 5,379,032 | 1/1995 | Foster et al. | 340/825.46 |
| 5,436,622 | 7/1995 | Gutman et al. | 340/825.46 |
| 5,524,061 | 6/1996 | Mooney et al. | 381/151 |

*Primary Examiner*—Krista M. Zele
*Assistant Examiner*—Scott Wolinsky

[57] ABSTRACT

A device for selectably providing an individual with different alert modes to a call on a telephone. The inventive device includes a switch positionable in series electrical communication between a ring circuit power source and an audible ringer of the telephone or a vibration assembly coupled to the switch. Via the switch, either one of the audible ringer and vibration assembly can be selected to alert the individual to a call or the ring circuit power source can be left absent a load.

3 Claims, 3 Drawing Sheets

TELEPHONE CALL ALERT DEVICE WITH SELECTABLE ALERT MODES

BACKGROUND OF THE INVENTION

1. Field of the Invention

The present invention relates to call annunciation devices and more particularly pertains to a cordless telephone vibration alert device for silently alerting an individual to a call on a cordless telephone.

2. Description of the Prior Art

The use of call annunciation devices is known in the prior art. More specifically, call annunciation devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art call annunciation devices include U.S. Pat. Nos. 5,293,161; 5,181,023; 5,175,459; 5,172,092; 5,117,449; and 3,825,686.

While these devices fulfill their respective, particular objectives and requirements, the aforementioned patents do not disclose a cordless telephone vibration alert device for silently alerting an individual to a call on a cordless telephone which includes a switch positionable in series electrical communication between a ring circuit power source and an audible ringer of a cordless telephone, and a vibration assembly coupled to the switch which can be electrically coupled to the ring circuit power source for vibrating the telephone to alert an individual to a call.

In these respects, the cordless telephone vibration alert device according to the present invention substantially departs from the conventional concepts and designs of the prior art, and in so doing provides an apparatus primarily developed for the purpose of silently alerting an individual to a call on a cordless telephone.

SUMMARY OF THE INVENTION

In view of the foregoing disadvantages inherent in the known types of call annunciation devices now present in the prior art, the present invention provides a new cordless telephone vibration alert device construction wherein the same can be utilized for silently alerting an individual to a call on cordless or cellular telephone. As such, the general purpose of the present invention, which will be described subsequently in greater detail, is to provide a new cordless telephone vibration alert device apparatus and method which has many of the advantages of the call annunciation devices mentioned heretofore and many novel features that result in a cordless telephone vibration alert device which is not anticipated, rendered obvious, suggested, or even implied by any of the prior art call annunciation devices, either alone or in any combination thereof.

To attain this, the present invention generally comprises a device for silently alerting an individual to a call on a cordless telephone. The inventive device includes a switch positionable in series electrical communication between a ring circuit power source and an audible ringer of a cordless telephone. A vibration assembly is coupled to the switch and can be electrically coupled to the ring circuit power source for vibrating the telephone to alert an individual to a call.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cordless telephone vibration alert device apparatus and method which has many of the advantages of the call annunciation devices mentioned heretofore and many novel features that result in a cordless telephone vibration alert device which is not anticipated, rendered obvious, suggested, or even implied by any of the prior art call annunciation devices, either alone or in any combination thereof.

It is another object of the present invention to provide a new cordless telephone vibration alert device which may be easily and efficiently manufactured and marketed.

It is a further object of the present invention to provide a new cordless telephone vibration alert device which is of a durable and reliable construction.

An even further object of the present invention is to provide a new cordless telephone vibration alert device which is susceptible of a low cost of manufacture with regard to both materials and labor, and which accordingly is then susceptible of low prices of sale to the consuming public, thereby making such cordless telephone vibration alert devices economically available to the buying public.

Still yet another object of the present invention is to provide a new cordless telephone vibration alert device which provides in the apparatuses and methods of the prior art some of the advantages thereof, while simultaneously overcoming some of the disadvantages normally associated therewith.

Still another object of the present invention is to provide a new cordless telephone vibration alert device for silently alerting an individual to a call on a cordless or cellular telephone.

Yet another object of the present invention is to provide a new cordless telephone vibration alert device which includes a switch positionable in series electrical communication between a ring circuit power source and an audible ringer of a cordless telephone, and a vibration assembly coupled to the switch which can be electrically coupled to the ring circuit power source for vibrating the telephone to alert an individual to a call.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
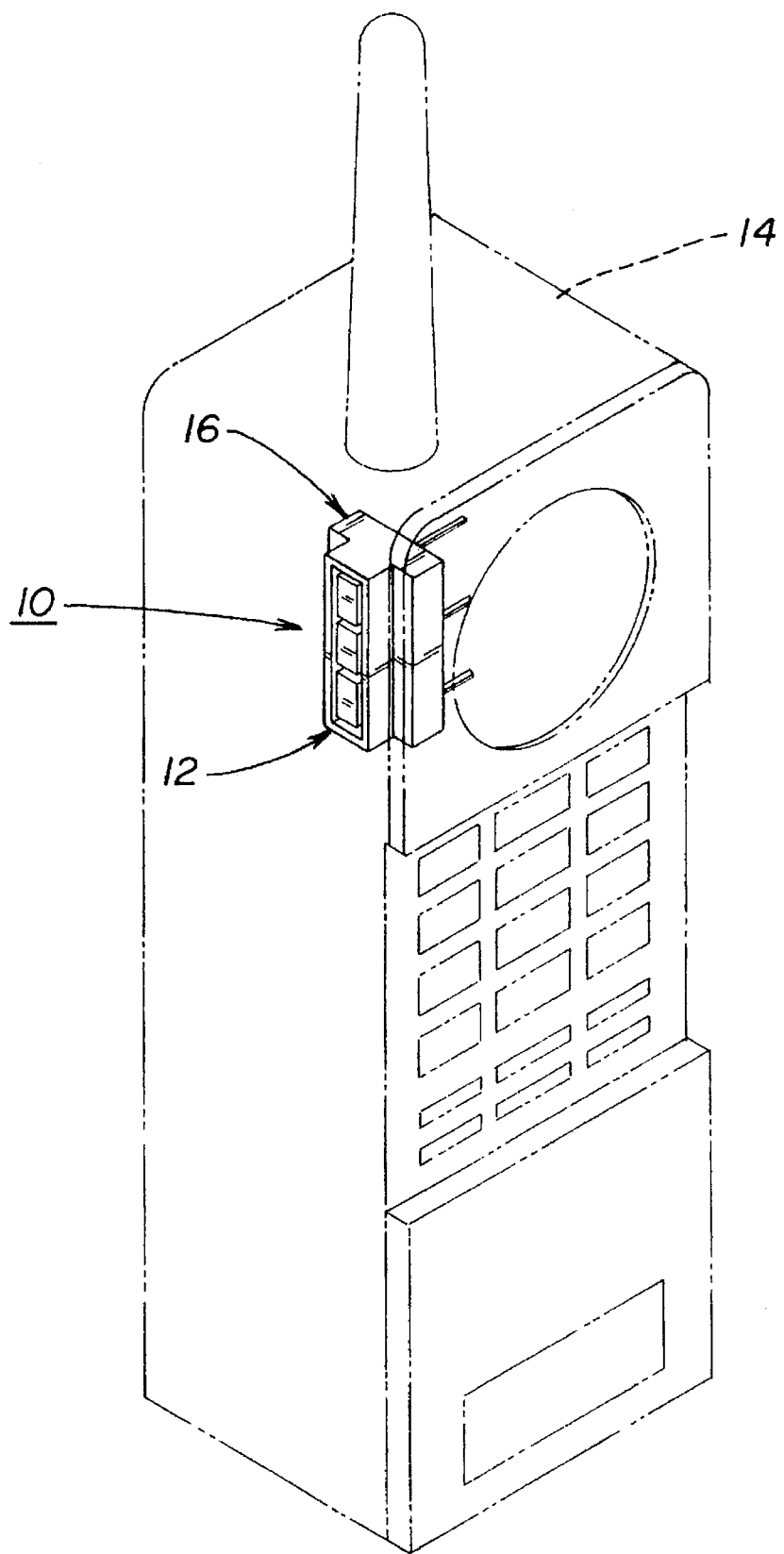
FIG. 1 is an isometric illustration of a cordless telephone vibration alert device according to the present invention in use.
Figure 2:
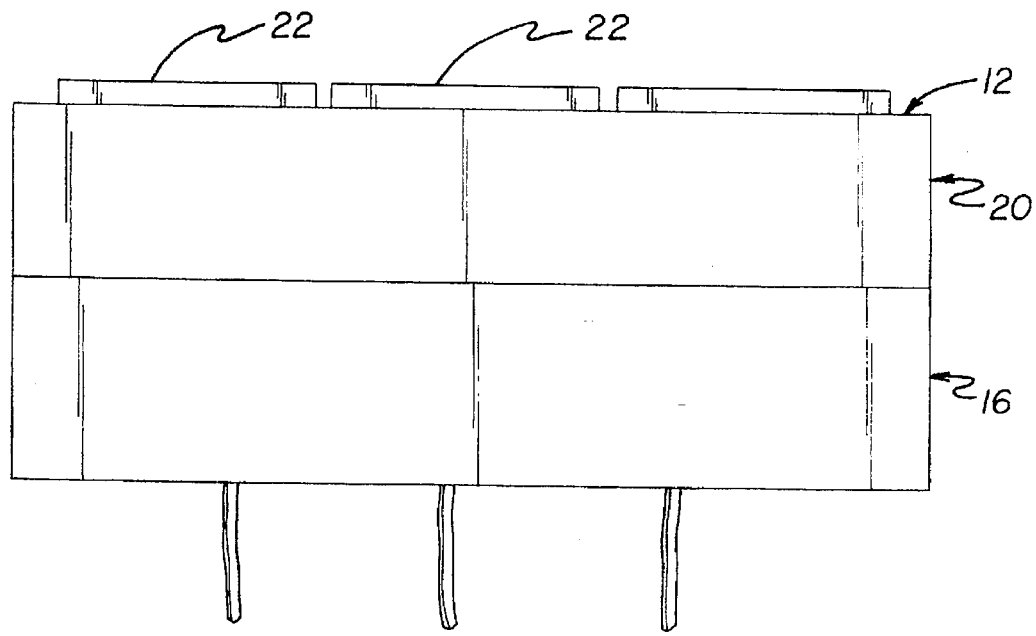
FIG. 2 is a side elevation view of the invention, per se.

With reference now to the drawings, and in particular to FIGS. 1–6 thereof, a new cordless telephone vibration alert device embodying the principles and concepts of the present invention and generally designated by the reference numeral 10 will be described.

More specifically, it will be noted that the cordless telephone vibration alert device 10 comprises a switch means 12 positionable in electrical communication with a ring circuit power source of a cordless telephone such as the cellular phone 14 illustrated in FIG. 1 of the drawings. A vibration means 16 is mounted to the switch means 12 and can be selectively positioned into electrical communication with the ring circuit power source of the cellular phone 14 through an operation of the switch means 12 for vibrating the cordless telephone to alert an individual to a call on the telephone. By this structure, an individual may selectively decouple an audible ringer 18 (see FIG. 6) from the ring circuit power source of the associated telephone 14 and couple the ring circuit power source to the vibration means 16, whereby an incoming call will result in the vibration means 16 effecting vibration of the telephone 14 to alert an individual to such call on the phone.

Figure 3:
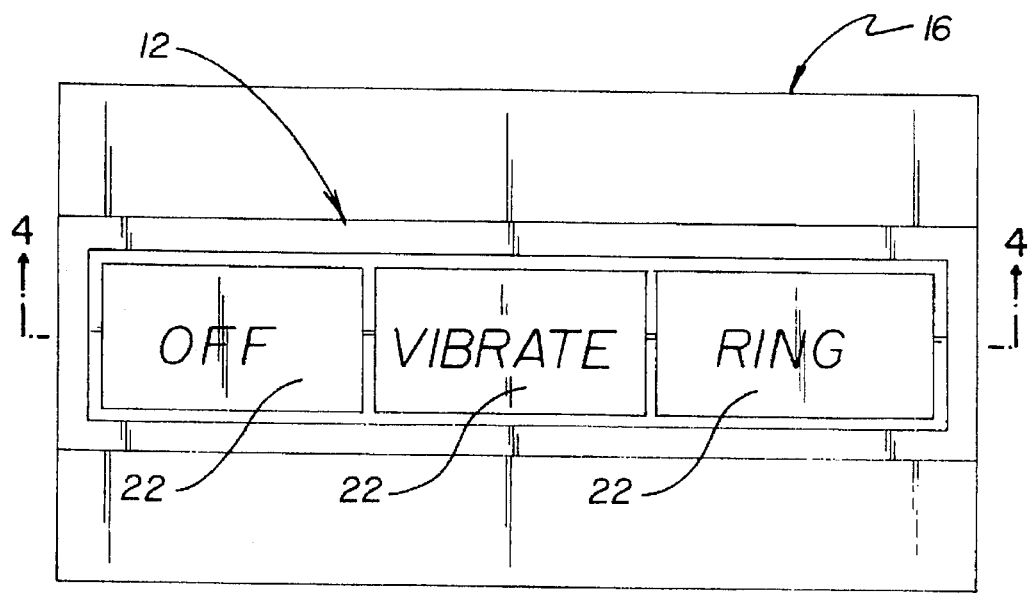
FIG. 3 is a top plan view thereof.
Figure 4:
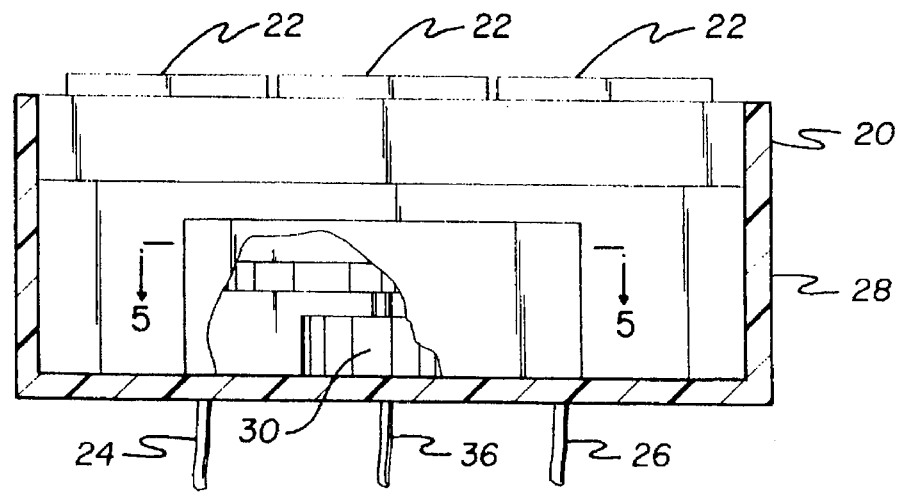
FIG. 4 is a cross sectional view taken along line 4—4 of FIG. 3.
Figure 5:
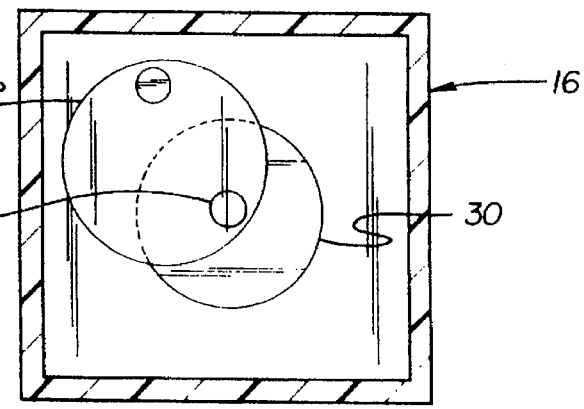
FIG. 5 is a cross sectional view taken along line 5—5 of FIG. 4.
Figure 6:
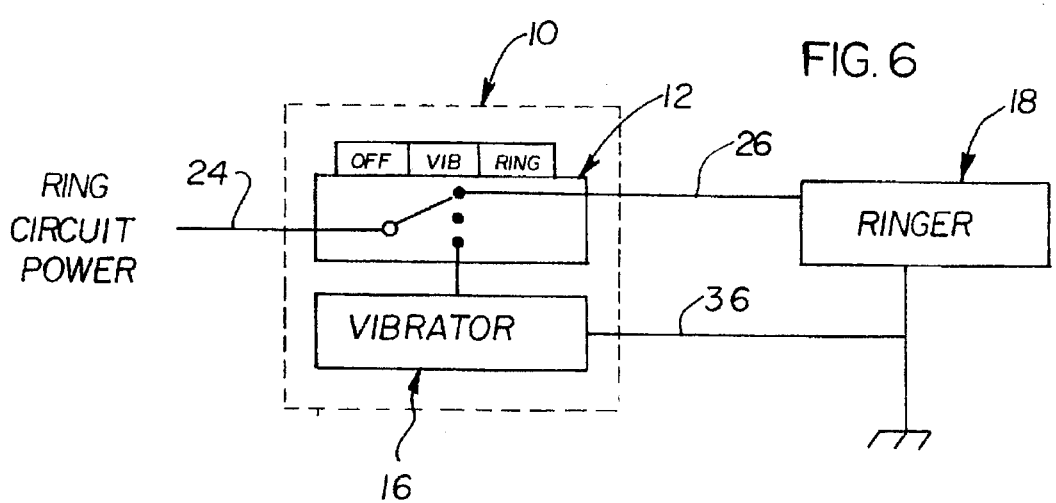
FIG. 6 is a diagrammatic illustration of the present invention.

Referring now to FIGS. 2 through 6 wherein the present invention 10 is illustrated in detail, it can be shown that the switch means 12 of the present invention 10 preferably comprises a switch housing 20 having at least one selector member 22 extending therefrom which can be manually manipulated by an individual during use of the device 10. The selector member 22 may comprise a sliding member, or alternatively may comprise a plurality of buttons projecting from the switch housing 20 which can be individually depressed to effect operation of the switch means 12. The switch means 12 further includes unillustrated structure therewithin operable to electrically couple wires of the device 10 in a particular electrical configuration. To this end, and as shown in FIG. 4, the switch means 12 further includes a ringing power wire 24 which can be positioned into electrical communication with a ring circuit power source of the associated telephone 14. An audible ringer wire 26 extends from the switch means 12 for electrical coupling with an audible ringer 18 of the telephone 14 as shown in FIG. 6 of the drawings. Thus, the switch means 12 is preferably positioned in series electrical communication between the ring circuit power source and the audible ringer 18 through a coupling of the ringing power wire and the audible ringer wire 26 to the respective components of the telephone. As shown in FIG. 3, the selectors 22 permit the ringing power wire 24 coupled to the ring circuit power source to be positioned in electrical communication with the audible ringer 18, the vibration means 16, or alternatively absent a load. By this structure, the switch means 12 can be selectively manually operated to effect electrical communication between the ring circuit power source and either or neither of the vibration means 16 and the audible ringer 18 of the telephone 14.

With continuing reference to FIGS. 4 and 5, it can be shown that the vibration means 16 of the present invention preferably comprises a vibration housing 28 integrally or otherwise fixedly secured to the switch housing 20 of the switch means 12. An electric motor 30 is mounted within the vibration housing 28 and includes a motor shaft 32 projecting therefrom. An eccentric weight 34 is coupled to the motor shaft 32 such that energization of the electric motor 30 will effect rotation of the eccentric weight 34 so as to create a vibration transferred from the vibration housing 28 to the switch housing 20 and subsequently to an outer exterior housing of the telephone 14 to which the switch means 12 is preferably secured when the device 10 is installed as shown in FIG. 1 of the drawings. The electric motor 30 is positioned in electrical communication with the switch means 12 through an unillustrated wire extending therebetween, and is further positioned in electrical communication with the ground of a power source of the telephone 14 through a ground wire 36 extending therebetween. By this structure, the ringing power wire 24 positioned in electrical communication with the ring circuit power source of the telephone 14 can be electrically coupled through the switch means 12 to the electric motor 30, whereby an incoming ring signal will effect energization of the electric motor 30 to rotate the eccentric weight 34 within the vibration housing 28 to create a vibration which will ultimately be transferred to the exterior housing of the telephone 14 to alert an individual holding the telephone to an incoming call.

In use, the cordless telephone vibration alert device 10 can be easily utilized for silently alerting an individual to a call on a cordless telephone 14. The integrated structure of the present invention allows the same to be easily installed into an existing telephone 14 as shown in FIG. 1 of the drawings. The device 10 may also be incorporated into the manufacturing of a new telephone 14 during assembly thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A telephone call alert device comprising:

a telephone having a power source;

a switch means connected in electrical communication with a ring circuit power source of the telephone; and a vibration means mounted to the switch means for vibrating the telephone to alert an individual to a call on the telephone;

wherein the switch means comprises a switch housing having at least one selector member extending therefrom which can be manually manipulated by an individual to operate the switch means, a ringing power wire extending from the switch means and connected into electrical communication with a ring circuit power source of the telephone; an audible ringer wire extending from the switch means and connected into electrical communication with an audible ringer of the telephone, whereby the switch means can be switched into a first orientation to couple the ringing power wire to the ring circuit power source and switched into a second orientation to leave the ringing power wire absent a load and to connect the ring circuit power source to the vibration means;

wherein the selector member comprises a plurality of buttons projecting from the switch housing which can be individually depressed to effect operation of the switch means;

wherein the vibration means comprises a vibration housing fixedly secured to the switch housing of the switch means; an electric motor mounted within the vibration housing and including a motor shaft projecting therefrom; and an eccentric weight coupled to the motor shaft such that energization of the electric motor will effect rotation of the eccentric weight so as to create a vibration transferred from the vibration housing to the switch housing and subsequently to an outer exterior housing of the telephone when the switch means is secured thereto;

wherein the electric motor is connected in electrical communication with a ground of the telephone.

2. The telephone call alert device of claim 1, wherein the switch means can be switched to effect electrical communication between the ring circuit power source and either of the audible ringer and the vibration means.

3. The telephone call alert device of claim 1, wherein the switch means can be switched into a third orientation to leave the ring circuit power source absent a load.

* * * * *